United States Patent
Xie et al.

(10) Patent No.: US 10,740,325 B2
(45) Date of Patent: Aug. 11, 2020

(54) SYSTEM AND METHOD FOR DELETING NODE IN BLOCKCHAIN NETWORK

(71) Applicant: ALIBABA GROUP HOLDING LIMITED, Grand Cayman (KY)

(72) Inventors: Guilu Xie, Hangzhou (CN); Ning Xia, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/715,963

(22) Filed: Dec. 16, 2019

(65) Prior Publication Data
US 2020/0117657 A1    Apr. 16, 2020

Related U.S. Application Data

(63) Continuation of application No. PCT/CN2019/109400, filed on Sep. 30, 2019.

(30) Foreign Application Priority Data

Sep. 5, 2019  (CN) .......................... 2019 1 0838733

(51) Int. Cl.
G06F 16/23    (2019.01)
G06F 16/27    (2019.01)

(52) U.S. Cl.
CPC .......... *G06F 16/2379* (2019.01); *G06F 16/27* (2019.01)

(58) Field of Classification Search
CPC .............................. G06F 16/2379; G06F 16/27
See application file for complete search history.

(56) References Cited

U.S. PATENT DOCUMENTS

| | | | |
|---|---|---|---|
| 6,594,624 B1 * | 7/2003 | Curet | G06F 30/18 703/2 |
| 9,372,892 B1 * | 6/2016 | Chainani | G06F 16/2471 |
| 10,158,527 B2 | 12/2018 | Anderson et al. | |
| 10,360,191 B2 | 7/2019 | Christidis et al. | |
| 2014/0149715 A1 * | 5/2014 | Inman | G06F 15/17393 712/29 |

(Continued)

OTHER PUBLICATIONS

Wang et al., A Survey on Consensus Mechanisms and Mining Strategy Management in Blockchain Networks, IEEE (2019). (Year: 2019).*

(Continued)

*Primary Examiner* — Neveen Abel Jalil
*Assistant Examiner* — Hubert Cheung
(74) *Attorney, Agent, or Firm* — Sheppard Mullin Richter & Hampton LLP

(57) ABSTRACT

Methods, systems, and apparatus, including computer programs encoded on computer storage media, for deleting a node in a blockchain network are provided. One of the methods includes: obtaining, by a first consensus node of the blockchain network, a transaction comprising a request for deleting a second consensus node of the blockchain network; in response to that consensus verification of the transaction succeeds, executing the transaction and sequentially numbering in a node list a plurality of remaining consensus nodes of the blockchain network excluding the second consensus node; and performing view change for the remaining consensus nodes to participate in future consensus verification.

19 Claims, 11 Drawing Sheets

(56) References Cited

U.S. PATENT DOCUMENTS

| | | |
|---|---|---|
| 2017/0300627 A1 | 10/2017 | Giordano et al. |
| 2018/0005186 A1 | 1/2018 | Hunn |
| 2018/0329945 A1 | 11/2018 | Horii et al. |
| 2018/0341930 A1 | 11/2018 | Moir et al. |
| 2019/0020729 A1* | 1/2019 | Chen ............... G06Q 20/02 |
| 2019/0026234 A1 | 1/2019 | Harnik et al. |
| 2019/0034465 A1 | 1/2019 | Shimamura |
| 2019/0036887 A1* | 1/2019 | Miller ............... G06F 16/27 |
| 2019/0058709 A1 | 2/2019 | Kempf et al. |
| 2019/0104196 A1* | 4/2019 | Li ................. G06F 16/2379 |
| 2019/0163887 A1 | 5/2019 | Frederick et al. |
| 2019/0165930 A1 | 5/2019 | Castinado et al. |
| 2019/0166133 A1 | 5/2019 | Frederick et al. |
| 2019/0179939 A1 | 6/2019 | Govindarajan et al. |
| 2019/0188086 A1* | 6/2019 | Maeda ............ G06F 11/1453 |
| 2019/0205873 A1 | 7/2019 | Kamalsky et al. |
| 2019/0207750 A1 | 7/2019 | Harvey |
| 2019/0207751 A1 | 7/2019 | Harvey |
| 2019/0235946 A1* | 8/2019 | Guo .................. H04L 67/1097 |
| 2019/0251077 A1* | 8/2019 | Yang ................. G06F 11/0709 |
| 2019/0251080 A1* | 8/2019 | Lu ................... G06F 16/2379 |
| 2019/0303927 A1* | 10/2019 | Shao ................ G06F 16/27 |
| 2019/0327097 A1* | 10/2019 | Tang ................ H04L 67/1097 |
| 2019/0377648 A1* | 12/2019 | Abraham .......... H04L 63/0823 |
| 2019/0379699 A1 | 12/2019 | Katragadda et al. |
| 2019/0386995 A1 | 12/2019 | Chafe et al. |
| 2020/0004643 A1* | 1/2020 | Yang ................. G06F 11/1438 |
| 2020/0021446 A1* | 1/2020 | Roennow .......... H04L 63/0478 |
| 2020/0059352 A1* | 2/2020 | Walling ............. H04L 9/0637 |

OTHER PUBLICATIONS

Jiang et al., High Performance and Scalable Byzantine Fault Tolerance, 2019 IEEE 3rd Information Technology, Networking, Electronic & Automation Control Conference (2019). (Year: 2019).*

Notice of Allowance for U.S. Appl. No. 16/715,126 dated Mar. 5, 2020.

* cited by examiner

800

┌─────────────────────────────────────────────────────────────┐
│ obtaining, by a first consensus node of a blockchain network, a transaction │
│ request for deleting a node and initiating consensus verification of the │
│ transaction request for deleting the node; after the consensus verification │
│ succeeds, the remaining consensus nodes executing the transaction for │
│ deleting the node and numbering in a local node list the remaining │
│ consensus nodes excluding the node to be deleted │
└─────────────────────────────────────────────────────────────┘
                                                          ⸜ S801
                              ↓
┌─────────────────────────────────────────────────────────────┐
│ performing, by the remaining consensus nodes, view change   │
└─────────────────────────────────────────────────────────────┘
                                                          ⸜ S803
                              ↓
┌─────────────────────────────────────────────────────────────┐
│ after the view change is completed, participating, by the remaining │
│ consensus nodes, in consensus verification                  │
└─────────────────────────────────────────────────────────────┘
                                                          ⸜ S805

FIG. 8

900 obtaining, by a first consensus node of the blockchain network, a transaction comprising a request for deleting a second consensus node of the blockchain network ⎯ S901 in response to that consensus verification of the transaction succeeds, executing the transaction and sequentially numbering in a node list a plurality of remaining consensus nodes of the blockchain network excluding the second consensus node ⎯ S902 performing view change for the remaining consensus nodes to participate in future consensus verification ⎯ S903

FIG. 9

SYSTEM AND METHOD FOR DELETING NODE IN BLOCKCHAIN NETWORK

CROSS REFERENCE TO RELATED APPLICATION

The present application is a continuation application of International Patent Application No. PCT/CN2019/109400, filed on Sep. 30, 2019, and entitled "SYSTEM AND METHOD FOR DELETING NODE IN BLOCKCHAIN NETWORK." The PCT application is based on and claims priority to and benefits of Chinese Application No. CN201910838733.5, filed with the State Intellectual Property Office (SIPO) of the People's Republic of China on Sep. 5, 2019. The entire contents of all of the above applications are incorporated herein by reference.

TECHNICAL FIELD

This application generally relates to systems and methods for deleting a node in a blockchain network.

BACKGROUND

Blockchain technologies may be built upon transmission networks (e.g., peer-to-peer network). Network nodes in a transmission network may perform data authentication and storage based on a chain-like data structure, and perform data generation and update based on a distributed consensus algorithm. In some cases, such nodes of the blockchain network may need to be deleted. Accordingly, it is desirable to provide a method for deleting a node in a blockchain network.

Existing technologies for deleting node often cause disruptions to normal operations of the blockchain. In one example, a current method for deleting a node in a blockchain network requires halting the entire blockchain system to perform node deletion and requires restarting the system after the deletion. As a result, the entire system has to experience down time.

SUMMARY

Various embodiments of the specification include, but are not limited to, systems, methods, and non-transitory computer readable media for deleting a node in a blockchain network.

According to some embodiments, a computer-implemented method for deleting a node in a blockchain network comprises: obtaining, by a first consensus node of the blockchain network, a transaction comprising a request for deleting a second consensus node of the blockchain network; in response to that consensus verification of the transaction succeeds, executing the transaction and sequentially numbering in a node list a plurality of remaining consensus nodes of the blockchain network excluding the second consensus node; and performing view change for the remaining consensus nodes to participate in future consensus verification. In some embodiments, the node to be deleted may be an activated consensus node of the blockchain network prior to the node deletion, and by the node deletion, the node becomes an inactivated consensus node of the blockchain network. In some embodiments, the node to be deleted may be a part of the blockchain network prior to the node deletion, and by the node deletion, the node is removed from the blockchain network.

In some embodiments, the transaction is configured to invoke a blockchain contract deployed in a blockchain that is maintained by the blockchain network.

In some embodiments, the blockchain contract comprises a genesis contract or a system contract.

In some embodiments, the obtaining, by a first consensus node, a transaction comprises: obtaining the transaction from a client-side device or a command console of a controller.

In some embodiments, the first consensus node locally maintains the node list, the node list comprising one or more of the following: consensus node identifier, consensus node IP address, and consensus node port number; and prior to the sequentially numbering in a node list a plurality of remaining consensus nodes of the blockchain network excluding the second consensus node, all consensus nodes of the blockchain network including the second consensus node were numbered sequentially in the node list.

In some embodiments, the node list is in a world state of a blockchain maintained by the blockchain network.

In some embodiments, the executing the transaction comprises: deleting the second consensus node from the node list; or configuring the second consensus node to an inactivated state in the node list.

In some embodiments, the performing view change comprises initiating the view change in response to detecting any of the following conditions: a number of consensus nodes in the node list is inconsistent with a number of consensus nodes in a current view; consensus node identifiers in the node list are inconsistent with consensus node identifiers in the current view; a number of activated consensus nodes in the node list is inconsistent with a number of consensus nodes in a current view; and identifiers of activated consensus nodes in the node list are inconsistent with identifiers of the consensus nodes in the current view.

In some embodiments, the performing view change comprises initiating the view change in response to receiving a message broadcast by the second consensus node for initiating view change.

In some embodiments, a number of replicas in the view change is a total number of the remaining consensus nodes excluding the second consensus node.

In some embodiments, the obtaining a transaction comprises: obtaining the transaction from the second consensus node, a third consensus node of the blockchain network, or an external device.

In some embodiments, the method further comprises: participating in consensus verification without the second consensus node.

According to other embodiments, a system for deleting a node in a blockchain network comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for deleting a node in a blockchain network comprises a plurality of modules for performing the method of any of the preceding embodiments.

According to some embodiments, a system for deleting a node in a blockchain network is implemented in a first consensus node of the blockchain network and comprises one or more processors and one or more computer-readable memories coupled to the one or more processors and having instructions stored thereon that are executable by the one or more processors to perform operations comprising: obtaining a transaction comprising a request for deleting a second consensus node of the blockchain network; in response to that consensus verification of the transaction succeeds, executing the transaction and sequentially numbering in a node list a plurality of remaining consensus nodes of the blockchain network excluding the second consensus node; and performing view change for the remaining consensus nodes to participate in future consensus verification.

According to other embodiments, a non-transitory computer-readable storage medium is implemented in a first consensus node of the blockchain network and is configured with instructions executable by one or more processors to cause the one or more processors to perform operations comprising: obtaining a transaction comprising a request for deleting a second consensus node of the blockchain network; in response to that consensus verification of the transaction succeeds, executing the transaction and sequentially numbering in a node list a plurality of remaining consensus nodes of the blockchain network excluding the second consensus node; and performing view change for the remaining consensus nodes to participate in future consensus verification.

According to yet other embodiments, an apparatus for deleting a node in a blockchain network is implemented in a first consensus node of the blockchain network and comprises: an obtaining module for obtaining a transaction comprising a request for deleting a second consensus node of the blockchain network; an executing module for, in response to that consensus verification of the transaction succeeds, executing the transaction and sequentially numbering in a node list a plurality of remaining consensus nodes of the blockchain network excluding the second consensus node; and a performing module for performing view change for the remaining consensus nodes to participate in future consensus verification.

Embodiments disclosed herein have one or more technical effects. In some embodiments, deleting a node in a blockchain network removes a malicious or faulty (e.g., abnormal, offline) node. The faulty status may be caused by, for example, configuration mistake, machine malfunction, network malfunction, software malfunction, etc. Therefore, deleting a node in the blockchain network improves the robustness and reliability of the blockchain network. In some embodiments, by dynamically executing a transaction for deleting a node, the node can be deleted without having to disrupt the operation of the blockchain network. In one embodiment, system down time is avoided during the node deletion process, and the blockchain network sustains its normal operation. In some embodiments, through view change, the remaining consensus nodes of the blockchain network (excluding the deleted node) each obtain an identical copy of node list which comprises numbering of the remaining consensus nodes. Thus, the remaining nodes may continue performing consensus verification and maintain the blockchain.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 8 illustrates a flowchart of a method for deleting a node in a blockchain network in accordance with various embodiments.

FIG. 9 illustrates a flowchart of a method for deleting a node in a blockchain network in accordance with various embodiments.

DETAILED DESCRIPTION

Figure 1:
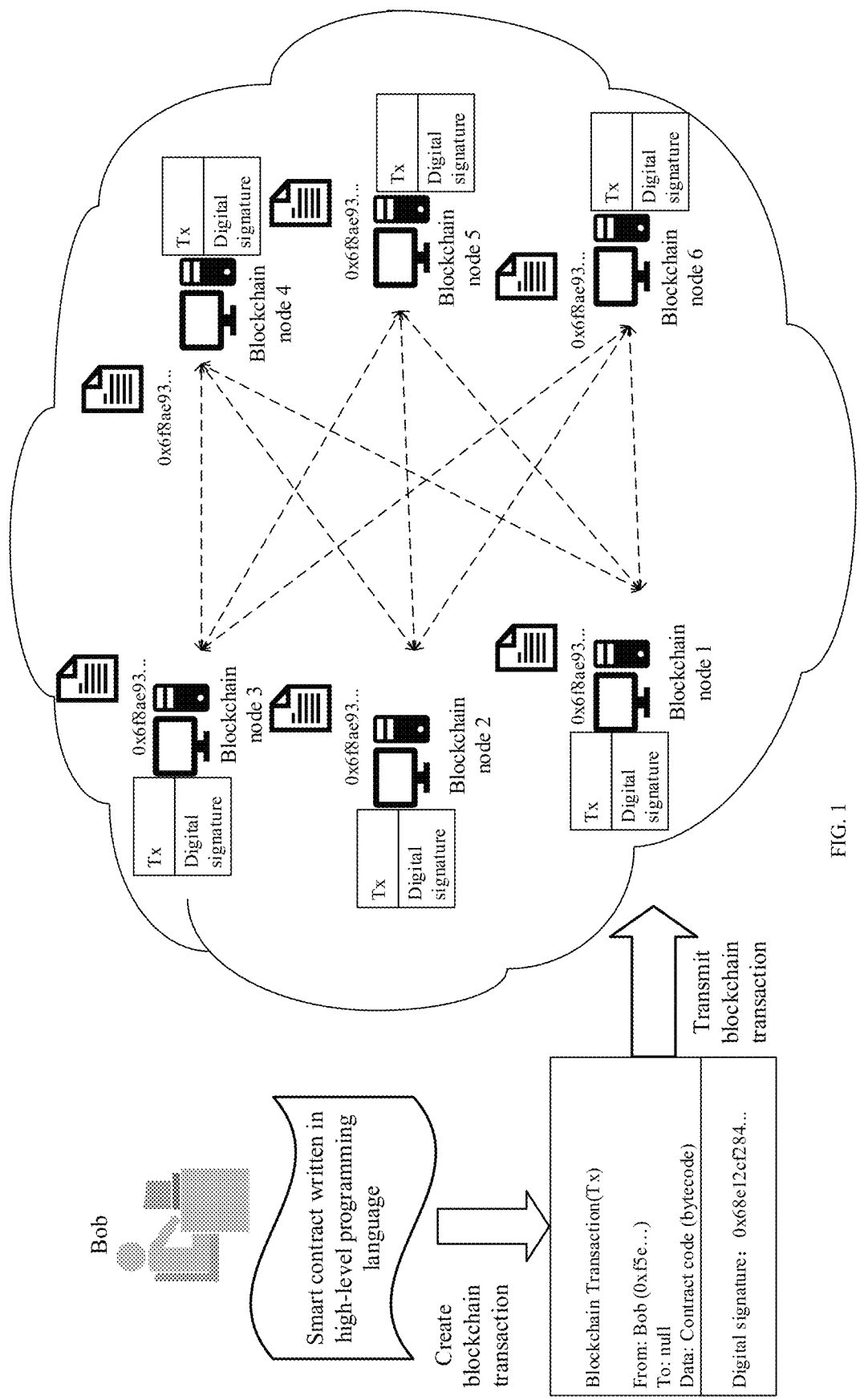
FIG. 1 illustrates a diagram for creating blockchain contract in accordance with various embodiments.

Blockchain may be categorized into three types: Public Blockchain, Private Blockchain, Consortium Blockchain. In addition, there may be various combinations among the three types of blockchain, such as Private Blockchain+Consortium Blockchain, Consortium Blockchain+Public Blockchain, etc. Among them, Public Blockchain is the most decentralized. For Public Blockchains represented by Bitcoin and Ethereum, participants (blockchain nodes or nodes for short) of the Public Blockchain can read data records from the blockchain, take part in transactions, and compete for bookkeeping rights for new blocks, etc. Also, each participant can freely join and exit the blockchain network and perform related operations. Whereas for Private Blockchain, data-writing rights for the blockchain network may be controlled by a certain entity or organization, and data-reading rights are determined by the entity or organization. Thus, Private Blockchain may be regarded as a weak centralized system, of which participating nodes are restricted and limited in number. Consortium Blockchain lies between Public Blockchain and Private Blockchain and can achieve "partial decentralization." Each node of the Consortium Blockchain may correspond to an entity or organization. Participants may join the Consortium Blockchain network through authorization, forming the consortium with shared interests and collectively maintaining the blockchain network's operation. For any of the various types of blockchain described above, there may be a need for dynamically deleting a node in a blockchain network.

In some embodiments, nodes with a certain level of voting power may be referred to as consensus nodes which form a blockchain network and maintain its operation through a consensus protocol. For example, consensus nodes may assume the responsibility of performing consensus verification of blockchain transactions (or transactions for short). By contrast, inactivated nodes (which may or may not be a part of the blockchain network) do not participate in such consensus verification. Through consensus verification, consensus nodes may come to a consensus (agreement) for a newly generated block to add to the blockchain. The newly generated block may comprise one or more transactions that are consensus verified by the consensus nodes. The consensus nodes may also make other consensus decisions for the blockchain, for example, setting service fees for the blockchain.

Each of Public Blockchain, Private Blockchain, and Consortium Blockchain may provide smart contract. A smart contract can be deployed in a blockchain through a blockchain transaction and later invoked by another blockchain transactions. For example, Ethereum supports users for creating and invoking complex algorithms. As a programmable blockchain, the core of Ethereum lies with Ethereum virtual machine (EVM). Each Ethereum node may operate an EVM. EVMs are Turing complete, which means that even complex algorithms can be implemented through them. Smart contract deployment and invocation can be executed in the EVMs.

As shown in FIG. 1, Bob may transmit a blockchain transaction comprising smart contract creation to an Ethereum network. Blockchain node 1's EVM may execute the blockchain transaction to generate a corresponding instance of the smart contract. In FIG. 1, "0x6f8ae93 . . . " represents an address of the smart contract. The "data" field of the blockchain transaction may store bytecode. The "to" field of the blockchain transaction may be a null blockchain account. After the blockchain nodes reach consensus through a consensus mechanism, the smart contract is successfully created and deployed in the blockchain, and future users can invoke this deployed smart contract.

After the smart contract is created, a contract account corresponding to the smart contract is created in the blockchain and has a specific address. Contract code and account data will be stored under the contract account. Behaviors of the smart contract are controlled by the contract code, and the contract account stores the status of the smart contract. In other words, smart contract enables creation of virtual accounts comprising contract code and account storage in blockchain.

Figure 2:
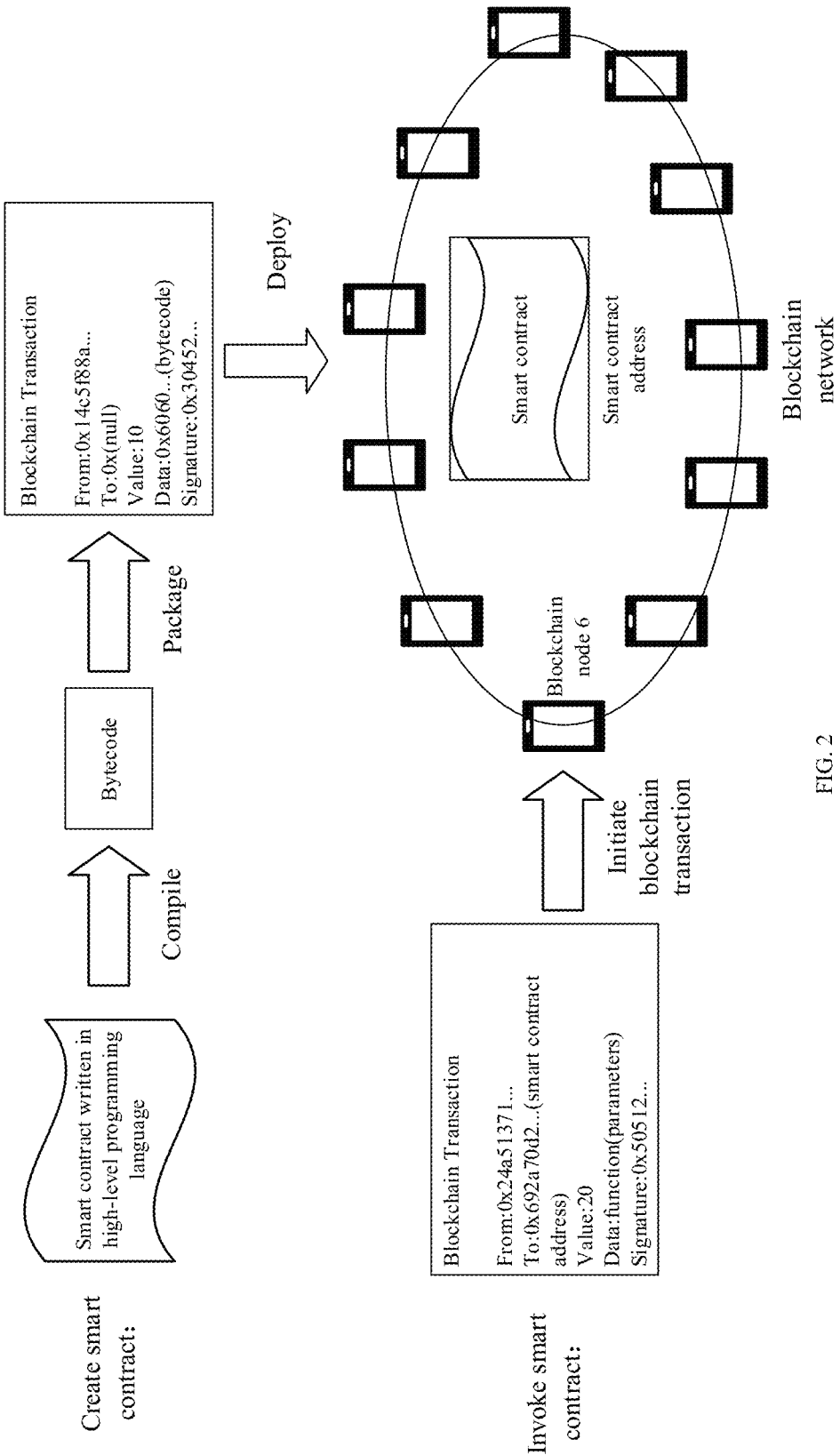
FIG. 2 illustrates a diagram for invoking blockchain contract in accordance with various embodiments.

As shown in FIG. 2, still using Ethereum as an example, Bob transmits a blockchain transaction comprising information for invoking the smart contract to the Ethereum network. Blockchain node 1's EVM may execute the blockchain transaction to generate a corresponding instance of the smart contract. For the blockchain transaction in FIG. 2, the "from" field may comprise an address of a blockchain account invoking the smart contract, "0x6f8ae93 . . . " in the "to" field may represent the address of the smart contract to be invoked, the "value" field may represent an Ether value, the "data" field may store the method and parameters for invoking the smart contract. After invoking the smart contract, the balance of Ethers held by the blockchain account may change. Further, a certain user client may view the balance through a blockchain node (e.g., blockchain node 6 in FIG. 2).

Smart contracts may be independently executed in each blockchain node of the blockchain network according to a prescribed manner. All execution records and data may be stored in the blockchain. Thus, after executing such blockchain transaction, a tamper-resistant and persistent transaction proof is saved to the blockchain.

Figure 3:
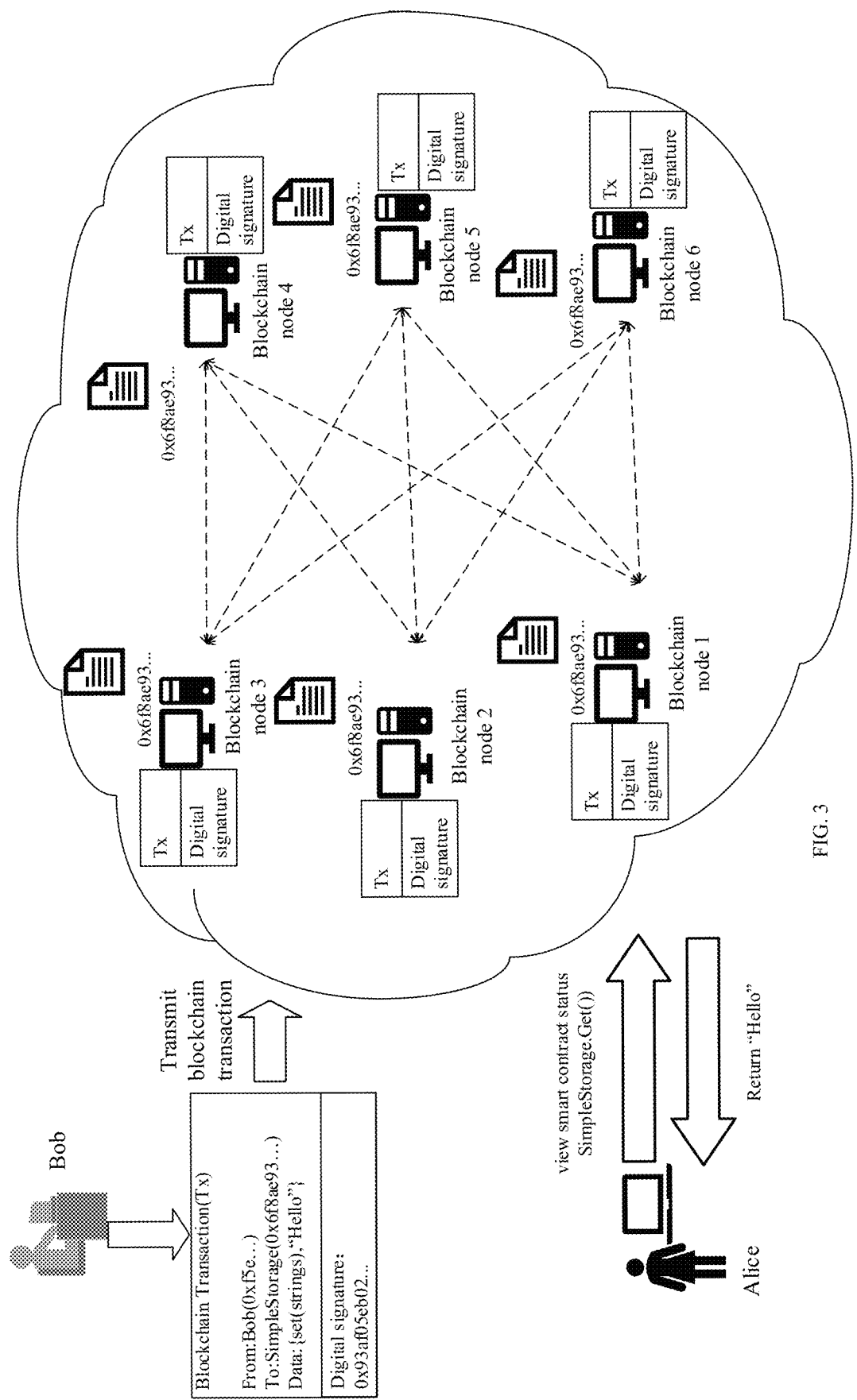
FIG. 3 illustrates a diagram for creating and invoking blockchain contract in accordance with various embodiments.

FIG. 3 shows the creation and invocation of a smart contract. Creating a smart contract in Ethereum involves steps such as writing smart contract, compilation into bytecode, and deployment in blockchain. Invoking a smart contract in Ethereum may refer to initiating a blockchain transaction pointing to an address of the deployed smart contract such that the contract code is executed in an EVM of each node in the Ethereum network.

In addition to having users to create smart contracts, smart contracts can be system-configured in the genesis block of the blockchain. This type of contracts may be referred to as genesis contracts. In genesis contracts, data structure, parameters, properties, and methods of the blockchain network may be configured. Further, accounts with system administrator authorization can create or modify system-level smart contracts ("system contracts" in short). In addition to EVM, different blockchain networks may adopt different virtual machines, which is not limited herein.

One difference between blockchain technologies and traditional decentralization technologies is recordkeeping at each node, or known as distributed recordkeeping, instead of the traditional centralized recordkeeping. In various blockchain networks, consensus algorithm (that is, the aforementioned consensus mechanism) may be implemented to ensure record consistency among the nodes that perform recordkeeping. When a node generates a new block, if the new block is accepted by other nodes, the other nodes will record the same new block. The process for the other nodes to acknowledge the new block is the consensus mechanism. Consensus mechanism is a mechanism in which blockchain nodes reach a network-wide consensus for block information, to ensure that new blocks are correctly deleted to the blockchain. Currently, mainstream consensus mechanisms include: Proof of Work (POW), Proof of Stake (POS), Delegated Proof of Stake (DPOS), Practical Byzantine Fault Tolerance (PBFT) algorithm, HoneyBadger Byzantine Fault Tolerance algorithm, etc.

Figure 4:
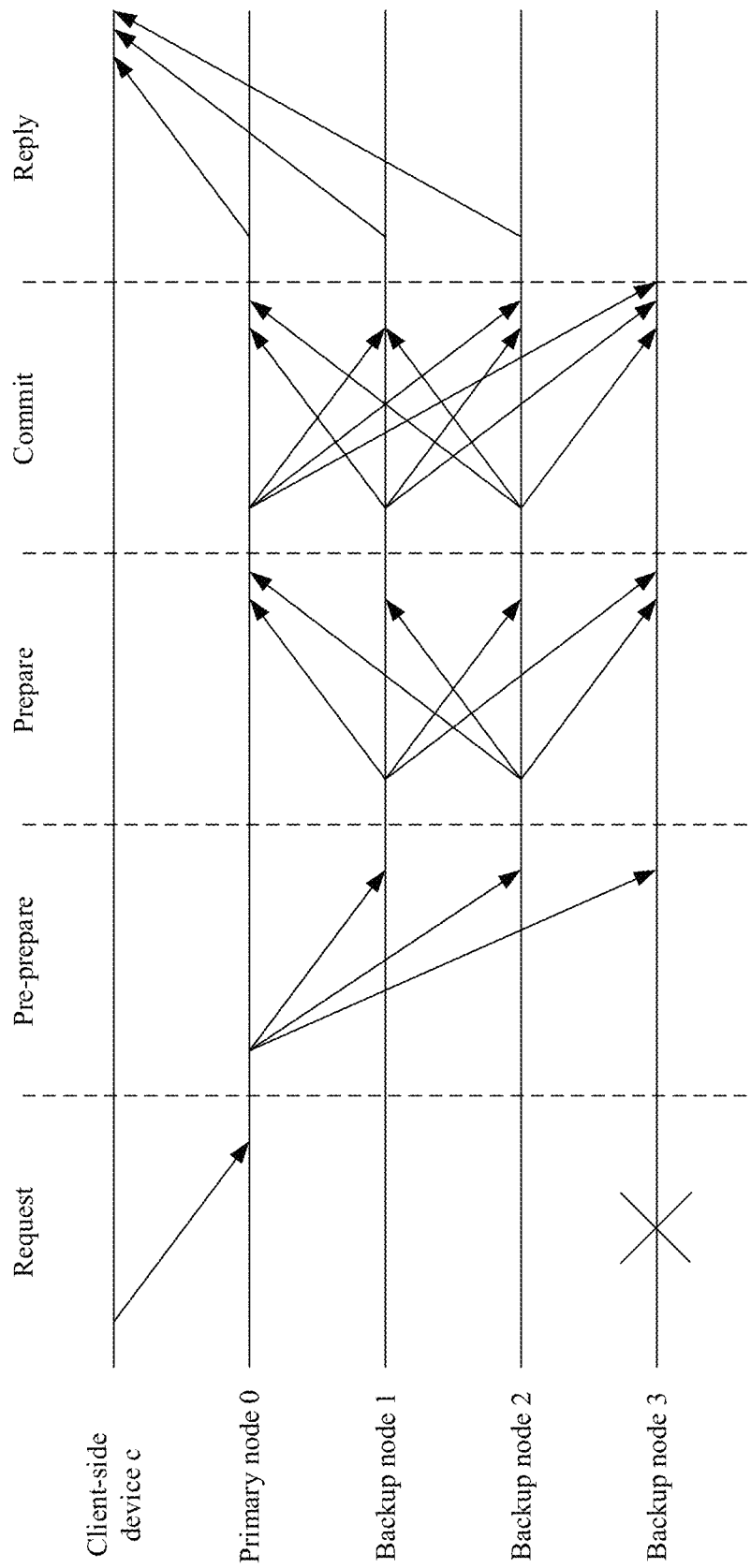
FIG. 4 illustrates a flow diagram for a Practical Byzantine Fault Tolerance (PBFT) algorithm.

FIG. 4 illustrates a flowchart of a traditional PBFT algorithm. The algorithm was proposed by Miguel Castro and Barbara Liskov in 1999, which solves the low efficiency problem for PBFT, lowering the complexity from exponential to polynomial level, which makes applications of PBFT in real-life systems practical. The thesis was published in the Proceedings of the Third Symposium on Operating Systems Design and Implementation (1999). The algorithm assumes that, if up to f backup replicas (i.e., nodes) are malicious or faulty, having a total of 3f+1 or more replicas can guarantee safety and liveness within the asynchronized system. To ensure that all replicas' data are consistent and satisfy the fault-tolerance requirement, a certain number of replicas, such as a set comprising a majority of nodes in a distributed system, are required to form a Quorum. For example, if the total number of replicas n is 3f+1, the Quorum is 2f+1. In another word, a PBFT-based blockchain network's tolerance level for malicious or faulty (e.g., abnormal, offline) nodes, represented by the maximum number of malicious or faulty nodes f that can be tolerated by the PBFT system, is $(n-1)/3$, rounded down to the nearest integer, where n is the total number of replicas. Thus, for a distributed system comprising four nodes, any three of them may form a Quorum.

Further, all replicas move through a succession of configurations called views. In a view, one replica is the primary node and the others are backup nodes. The primary node of a view is replica p such that p=v mod |R|, where v is the view number, views are numbered consecutively, and |R| is the number of replicas. When the primary node becomes faulty, a view change protocol needs to be triggered for making adjustment to change the primary node when the system is faulty.

The PBFT algorithm is as follows.
1. Client-side device c sends a request to a primary node 0 (replica 0);
2. The primary node 0 broadcasts the request to each backup node;
3. Each of all the replicas executes the request and sends a corresponding result to the client-side device c;
4. The client-side device c collects identical results respectively from f+1 different replicas as the final result for the operation.

The following discusses an example of PBFT (in conjunction with the famous Byzantine Generals' Problem). Here, it is assumed that n=4 and f=1, that is, there are four nodes in total, of which the number of faulty nodes is one. It is assumed that the node number is respectively 0, 1, 2, and 3, and the faulty node is node 3. The process is as follows.
1. (Request phase) Client-side device c sends the request to the primary node 0;
2. (Pre-prepare phase) Primary node 0 receives the request from client-side device c (or requests from a set of client-side devices), arranges the requests in a sequence (in the case of a set of client-side devices), and packages the request(s) into a message m. Then, the Primary node 0 broadcasts a prep-prepare message to nodes 1, 2, and 3 (i.e., backup nodes 1, 2, and 3, also referred to as replica or node 1, 2, and 3). The pre-prepare message includes the message m.
3. (Prepare phase) After receiving the pre-prepare message, if nodes 1, 2, and 3 successfully validate the message m, each of the nodes 1, 2, and 3 will re-broadcast the message m. For example, node 1 will broadcast a prepare message to nodes 0, 2, and 3; and node 2 will broadcast a prepare message to nodes 0, 1, and 3. Node 3 may experience a downtime and is unable to broadcast. Further, each node receives the prepare messages broadcast by other nodes. Each node may add the prepare message broadcast by itself (the prepare message indicating endorsement by itself) and the received prepare messages (the prepare messages indicating endorsement by other nodes) to a local log. If the node receives Quorum-1 confirmations of the same message (with the pre-prepare message and the Quorum-1 prepare messages, the local log will have a Quorum number of confirmations), the node transitions to the prepare phase.
4. (Commit phase) Each participating consensus node that has entered the prepare phase broadcasts a commit message to other consensus nodes, and adds the commit message broadcast by itself to the local log (the commit message indicating endorsement by itself). Further, the each node receives commit messages broadcast by other nodes. If the node receives Quorum-1 valid commit messages, the node adds the commit messages to the local log (with the commit message broadcast by itself and the Quorum-1 commit messages, the local log will have a Quorum number of commit messages) and transitions to a committed state.
5. (Reply phase) Each of all nodes that participates in consensus verification sequentially executes in its local virtual machine the request or the sequenced requests in the message m of the pre-prepare message, and sends a reply to client-side device c.

If the client-side device c receives f+1 identical reply messages, it indicates that the request put forth by the client-side device c has reached a network-wide consensus. Otherwise, the client-side device c may need to determine whether to re-send the request to the primary node 0.

The process and description above with respect to FIG. 4 is the traditional PBFT algorithm. The process may be initiated by the client-side device, such that one or more transactions in the request message initiated by the client-side device undergo consensus verification, and a result of the consensus verification is returned to the client-side device at the conclusion of the consensus verification.

In the Consortium Blockchain scenario, consensus verification (e.g., the pre-prepare, prepare, and commit process of FIG. 4 above) can be initiated by any node. In the Consortium Blockchain scenario, the client-side device is optional. If excluding the client-side device, the request and reply phases of FIG. 4 become optional, and the primary node may initiate PBFT consensus verification after obtaining a certain number of blockchain transactions. If including the client-side device, the consensus verification may not be initiated by the client-side device, and may rather be initiated by the primary node after the primary node obtains a certain number of blockchain transactions. That is, the pre-prepare phase in FIG. 4 may not be directly triggered by the request phase.

If the primary node acts maliciously or is faulty (e.g., abnormal, offline) and fails to broadcast the request of the client-side device, the client-side device can configure a timeout mechanism. If timeout happens, the client-side device may broadcast the request to all replicas. If a replica detects that the primary node acts maliciously or is faulty (e.g., abnormal, offline), the replica can initiate a view change protocol phase to change the primary node.

In addition, an erroneous proposal put forth by the primary nodes may cause the pre-prepare, prepare, and commit three-phase consensus verification to fail. Alternatively, in the prepare and commit phases, consistent Quorum numbers may not be reached, which also frustrates consensus verification. Under these conditions, view change may also be initiated to change the primary node.

Figure 5:
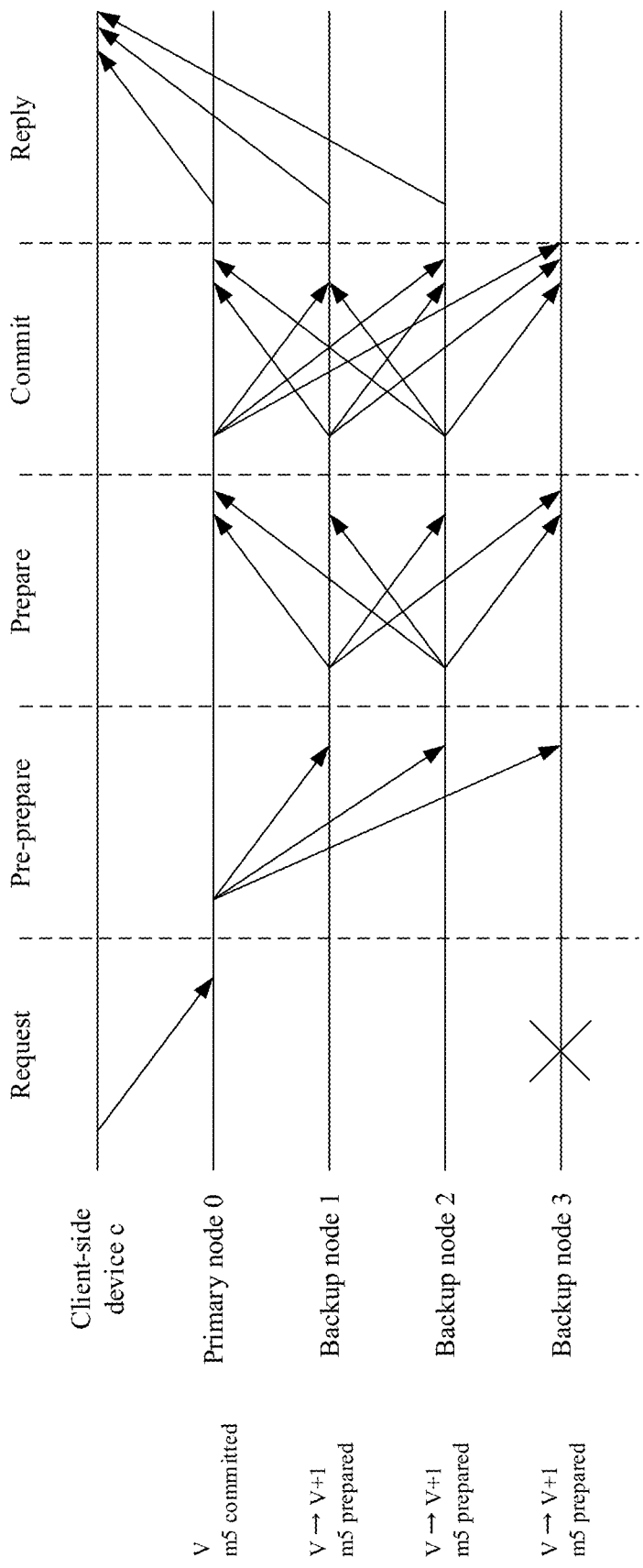
FIG. 5 illustrates a flow diagram for recovering after executing view change of a PBFT algorithm.

In the view change protocol phase, the previous asynchronization between a node and other nodes need to be addressed, to let the node recover after view change (VC). As shown in FIG. 5, for example, at view v before the view change, the primary node replica 0 has committed and executed propose m5 (e.g., message m5) corresponding to <v, n, d>, where v is the view number, n is the total number of nodes, and d is a message digest of the propose m5. However, replica 1 may not have committed propose m5 due to network lagging, and is still in a prepared phase. Replica 2 (and replica 3) may also be in the prepared phase for propose m5. Thereafter, replica 0 experiences downtime. Thus, different nodes are in different states. After changing the primary node, replica 0 may recover through restart. The primary node may have changed to replica 1, and replicas 1-3 need to catch up with replica 0 in the message processing process. Therefore, the new primary node replica 1 needs to re-send propose m5 that is in the prepared state for replicas 1-3 to execute and become synchronized with replica 0's state. Without this, at a new view v+1, replicas 1-3 may complete three-phase consensus verification of a new message m6, but only replica 0 has executed m5, while replicas 1-3 have not executed m5. That is, at the new view v+1, the execution of the new message m6 by replicas 1-3 started from a different state than by replica 0. This may cause inconsistency among virtual machines of different nodes and result in forking. In addition, in the above process, if replica 0 is in prepared state with respect to m5, that is, if replica 0 has not executed m5 on its virtual machine and the other replicas lag behind replica 0 in processing, then replica 0's prepared state can be deleted without affecting the consistency of the overall system.

The view change protocol phase may include a view change protocol process and a new view protocol process. Change of the primary node is completed after the two protocol processes are executed. After the primary node is changed, the view number deletes one, changing to v+1. According to p=(v+1)% n, the primary node replica 0 of FIG. 4 is changed to replica 1.

Figure 6:
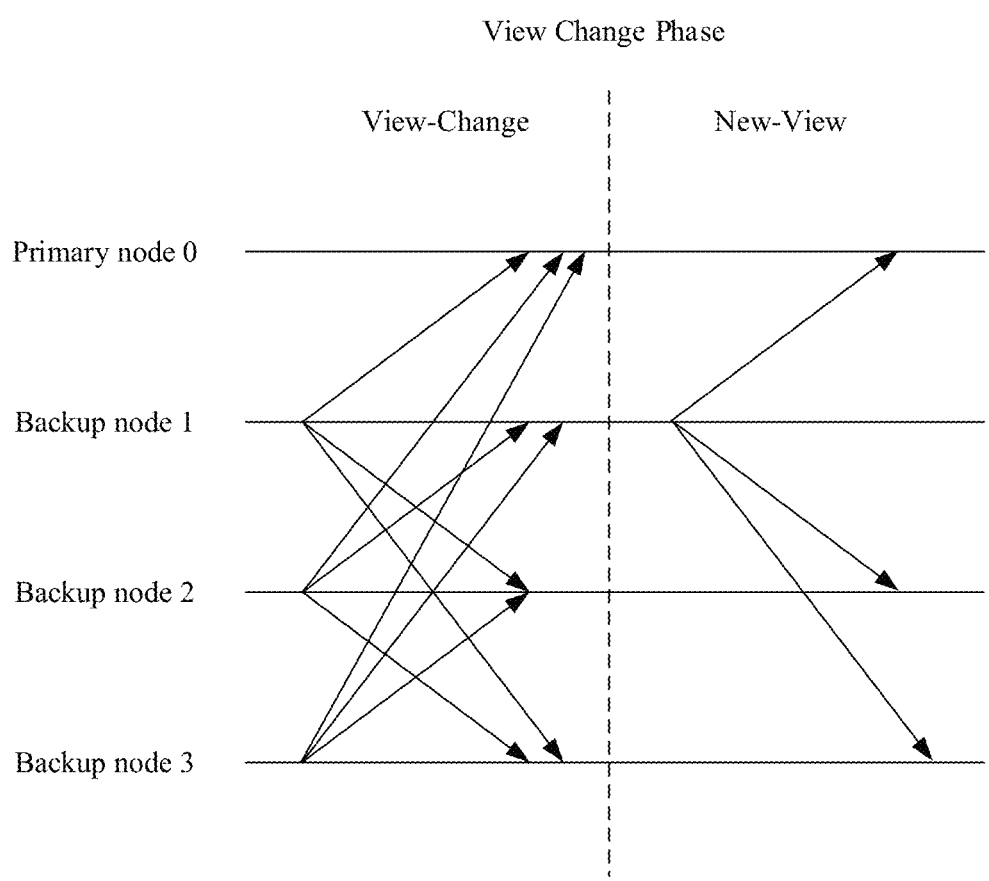
FIG. 6 illustrates a flow diagram for executing view change of a PBFT algorithm.

For example, as shown in FIG. 6, a backup node that detects a malicious or faulty (e.g., abnormal, offline) primary node can broadcast message <view change, v+1, n, C, P, i> to other backup nodes. As shown in FIG. 6, replica 1 detects that the original primary node replica 0 acts maliciously or is faulty (e.g., abnormal, offline), replica 1 sends message <view change, v+1, n, C, P, i> to replica 0, replica 2, and replica 3. Similarly, replica 2 sends message <view change, v+1, n, C, P, i> to replica 0, replica 1, and replica 3, and replica 3 sends message <view change, v+1, n, C, P, i> to replica 0, replica 1, and replica 2.

For the broadcast message, "view change" is a protocol identifier, indicating that the protocol is the view change protocol. The next view number is v+1, and "n" is the number of the latest stable checkpoint, "C" is a set of 2f+1 checkpoint messages that have been verified. "P" is optional, and if present, indicates a set of one or more messages that have reached the prepared state for the backup node that send the view change message (corresponding to each <v, n, d> in the prepared state, including the pre-prepare message and signatures of 2f different nodes).

After the new primary node p=(v+1) mod |R| such as replica 1 in FIG. 6 receives 2f valid view change messages, the new primary node broadcasts message <new view, v+1, V, O, p> to other nodes. "New view" is a protocol identifier, indicating that the protocol is the new view protocol. The next view number is v+1. "V" includes view change messages along with signatures received by the new primary node from 2f different nodes, as well as the view change message with respect to v+1 sent or to be sent by the new primary node itself "O" is a set of unexecuted pre-prepare messages re-sent by the primary node, and "p" is the signature of the current node. Selection rules for the set of pre-prepare messages include:
1. Obtain from V the stable checkpoint with the smallest number min-s, obtain from V the prepare message with the largest number max-s.
2. Between min-s and max-s, if message set P exists, then create message <<pre-prepare, v+1, n, d>, m>. Otherwise, create a null pre-prepare message <<pre-prepare, v+1, n, d(null)>, m(null)>, where m(null) is null message, d(null) is a digest of the null message.

When a backup node receives the new view message from the primary node, the backup node validates the signature, the view change message in V, and O. If valid, then the backup node enters the v+1 state, and starts processing the pre-prepare messages in O.

In the example of Consortium Blockchain, in a Consortium Blockchain scenario, a node may correspond to one or more accounts. Similarly, a node may correspond to no account, and merely function as a consensus node. In addition, Consortium Blockchain may comprise genesis contract or a system contract, that may be generated as described above. The genesis contract/system contract may configure a consensus node list (node list or list for short) of the Consortium Blockchain, for example, configure a set of public keys of consensus nodes and arrange the public keys in the set according to a predetermined order. Each consensus node of the Consortium Blockchain may locally store a local node list according the consensus node list in the genesis contract. In the local node list, each consensus node may arrange the consensus nodes according to the corresponding public keys according to the order specified in the generate contract/system contract. Thus, each consensus node's local list includes the same consensus nodes arranged in the same order. Also, in the genesis contract/system contract, method and parameter configurations for consensus nodes may be added. Thus, based on the genesis contract/system contract, each node can accomplish the operation of node deletion by changing the nodes in the local node list.

When an account initiates a request to delete a consensus node, the request being for example a transaction request, a first consensus node may receive the request. For example, the request may be a node deletion request put forth by a client-side device, thus triggering the process of node deletion. Alternatively, the request may be a node deletion request received by the first consensus node from a command console of a controller, thus triggering the process of node deletion. The controller may be operated by an administrator controlling the corresponding node, for example, through graphical or coded instructions. For consensus algorithms with primary node such as PBFT, the first consensus node may be the primary node. The first consensus node may obtain the transaction request directly from the client-side device or controller, or from other consensus nodes that forwarded the transaction request. For consensus algorithms with no primary node such as HoneyBadger Byzantine Fault Tolerance, there is no primary node, and the first consensus node is one of a plurality of consensus nodes.

Figure 7:
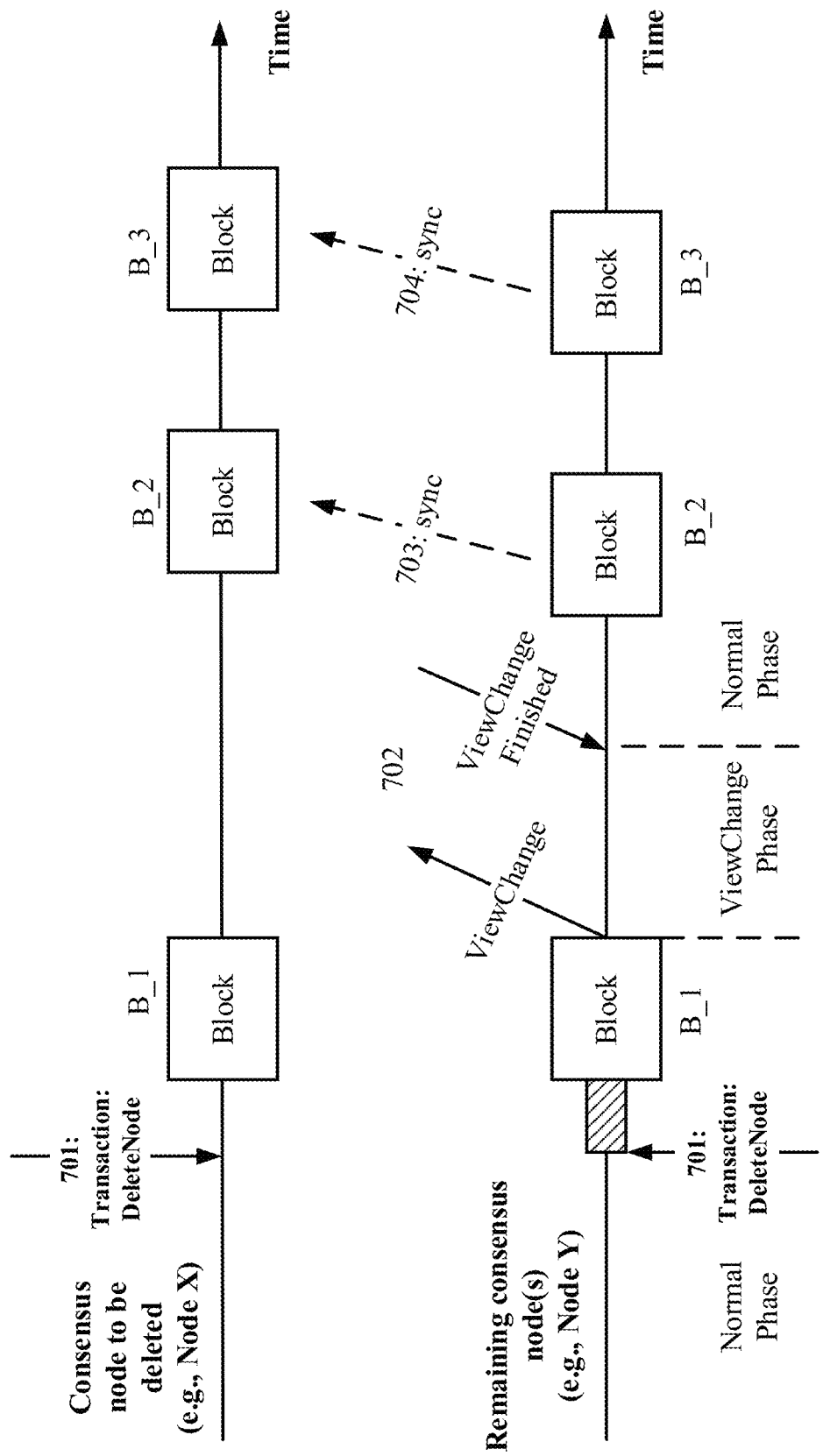
FIG. 7 illustrates a flow diagram for deleting a node in a blockchain network in accordance with various embodiments.

FIG. 7 illustrates a flow diagram for deleting a node in a blockchain network in accordance with various embodiments. The operations presented below are intended to be illustrative. Depending on the implementation, the exemplary steps may include additional, fewer, or alternative steps performed in various orders or in parallel. FIG. 7 provides an example of deleting a node (node X) in blockchain network comprising a plurality of consensus nodes. The blockchain network maintains a blockchain. Node X may be deleted as a primary or backup node of a PBFT-based blockchain network.

Deleting the node in the blockchain network may include at least the following embodiments. In some embodiments, node X may be an activated consensus node of the blockchain network prior to the node deletion, and by the node deletion, node X becomes an inactivated consensus node of the blockchain network. An activated consensus node may participate in consensus verification. However, an inactivated consensus node may not participate in consensus verification and therefore may be a non-consensus node. In some embodiments, node X may be a part of the blockchain network (e.g., as an activated consensus node) prior to the node deletion, and by the node deletion, node X is removed from the blockchain network.

FIG. 7 shows two parallel time axes, the top time axis carrying time-dependent statuses of a local blockchain copy of node X and the bottom time axis carrying time-dependent statuses of a local blockchain copy of one of the remaining consensus nodes (node Y). Each of the remaining consensus nodes may perform the steps performed by node Y. Between the axes, there are various interactions in terms of message communication and data synchronization. In some embodiments, each consensus node of the blockchain network locally maintains a node list, the node list comprising one or more of the following: consensus node identifier, consensus node IP address, and consensus node port number. The consensus nodes of the blockchain network are numbered sequentially in the node list. Due to the node deletion, a total number of the consensus nodes of the blockchain network may decrease, and the numbering of the consensus nodes in the node list may change. In one embodiment, the node list is in a world state of a blockchain maintained by the blockchain network.

Along the top axis, node X changes from being an activated consensus node of the blockchain network to not being an activated consensus node of the blockchain network. Along the bottom axis, node Y experiences from a normal phrase, to a view change phase, and back to the normal phase. Also along the top and bottom axes, the blockchain changes its state when one or more new blocks are added, thus the blockchain state is updated from B_1 to B_2, and B_3. The "block" box on each axis represents the blockchain as seen or stored by node X or node Y.

In some embodiments, at step 701, an administrative account, external account, or an alternative account may initiate a transaction "DeleteNode" to delete node X in the blockchain network. The transaction may be initiated by node X, node Y, or an external device coupled to the blockchain network and broadcast to all of the consensus nodes. Node Y may obtain the transaction from a client-side device or a command console of a controller. For example, node Y may obtain the transaction from node X, another consensus node of the blockchain network, or an external device. At this time, the local blockchain copy of node X is at B_1. The consensus nodes (e.g., node X, node Y) may perform consensus verification of the transaction. In some embodiments, the transaction is configured to invoke a blockchain contract deployed in a blockchain that is maintained by the blockchain network. In some embodiments, the blockchain contract comprises a genesis contract or a system contract.

In some embodiment, in response to that consensus verification of the transaction succeeds, the consensus nodes (e.g., node X, node Y) may each execute the transaction and sequentially number in a node list a plurality of remaining consensus nodes of the blockchain network excluding node X.

In some embodiments, to execute the transaction, node Y may delete node X from the node list of node Y, or configure node X to an inactivated state in the node list of node Y.

In some embodiments, each consensus node (e.g., node X, node Y) locally maintains the node list, the node list comprising one or more of the following: consensus node identifier, consensus node IP address, and consensus node port number. Prior to the sequentially numbering in a node list a plurality of remaining consensus nodes of the blockchain network excluding node X, all consensus nodes of the blockchain network including node X and node Y were numbered sequentially in the node list. For example, before the node deletion, the node list indicates that the blockchain network includes node A (number 0), node B (number 1), node C (number 2), node X (number 3), and Y (number 4); and after the node deletion, the node list indicates that the blockchain network includes node B (number 0), node A (number 1), node C (number 2), and Y (number 3).

In some embodiments, at step 702, the consensus nodes (e.g., node X, node Y) may initiate view change. For example, the consensus nodes may initiate the view change in response to detecting any of the following conditions: a number of consensus nodes in the node list is inconsistent with a number of consensus nodes in a current view; consensus node identifiers in the node list are inconsistent with consensus node identifiers in the current view; a number of activated consensus nodes in the node list is inconsistent with a number of consensus nodes in a current view; and identifiers of activated consensus nodes in the node list are inconsistent with identifiers of the consensus nodes in the current view. In one embodiment, the consensus nodes may initiate the view change in response to receiving a message broadcast by node X for initiating view change.

In some embodiments, the remaining consensus nodes (e.g., node Y) may perform view change for the remaining consensus nodes to participate in future consensus verification. A number of replicas in the view change is a total number of the remaining consensus nodes excluding the second consensus node. In some embodiments, the remaining consensus nodes may participate in consensus verification without node X. In some embodiments, at steps 703 and 704, although not being an activated consensus node, node X may synchronize to the blockchain to update its local blockchain copy.

As such, the blockchain operation is not disrupted during the node deletion. Consensus verification may still be performed during the node deletion process. Node deletion can be achieved without having to halt the blockchain system, thus eliminating system down time.

FIG. 8 illustrates a flowchart of a method 800 for deleting a node in a blockchain network in accordance with various embodiments. In some embodiments, the blockchain network may be based on a Consortium Blockchain. In some embodiments, the blockchain network may be based on PBFT.

S801 includes: obtaining, by a first consensus node of a blockchain network, a transaction request for deleting a node and initiating consensus verification of the transaction request for deleting the node; after the consensus verification succeeds, the remaining consensus nodes executing the transaction for deleting the node and numbering in a local node list the remaining consensus nodes excluding the node to be deleted In some embodiments, the transaction request may be a transaction request for invoking a contract. In that transaction request, the address of the invoked smart contract, invoking method, and input parameters may be specified. For example, the invoked contract may be the aforementioned genesis contract/system contract, the invoking method may be a method for deleting node, and the input parameter may comprise one or more of the following of the node to be deleted: identifier, IP address, and port number.

In some embodiments, a first consensus node may trigger the process of node deletion through receiving the transaction request for deleting the node. For example, as described above, the first consensus node may trigger the process of node deletion through receiving the transaction request for deleting the node from a client-side device, or the first consensus node may trigger the process of node deletion through receiving the transaction request for deleting the node from a command console of a controller. The controller may be operated by an administrator controlling the corresponding node, for example, through graphical or coded instructions. Alternatively, the first consensus node may receive relevant information of the node to be deleted from the node to be deleted for triggering the process of deleting the node.

In some embodiments, transaction requests for deleting nodes are propagated to the respective consensus nodes in the blockchain network based on the underlying peer-to-peer (P2P) network. After the first consensus node receives the transaction request for deleting the node, the first consensus node may initiate the consensus verification process as the primary node associated with a consensus algorithm having a primary node or as the consensus node associated with a consensus algorithm having no primary node. Taking consensus algorithms having a primary node such as PBFT as an example, the first consensus node may be the primary node, and may initiate a consensus verification process for the transaction request for deleting the node, that is, mainly including the pre-prepare, prepare, and commit process in FIG. 4 above. Alternatively, the first consensus node may be a backup node that receives and forwards the transaction request to a primary node for initiating a consensus verification process.

In some embodiments, after the consensus verification is completed, nodes in the blockchain network locally have the message content in the transaction request with respect to the node to be deleted, and a consensus is reached. Moreover, if the content of the message in the transaction request for deleting the node together with other messages form a consensus result, the message content in the transaction request for deleting the node has the same message sequence on different nodes, that is, at least a Quorum number of consensus nodes have reached a consensus with respect to the content of and an order associated with the message in the node deletion request.

In some embodiments, after S801, as previously described, at least a Quorum number of consensus nodes have reached consensus with respect to the content of the message in the transaction request including the node deletion. Furthermore, the remaining consensus nodes may execute the corresponding contract locally. For example, the remaining consensus nodes may invoke the genesis contract/system contract mentioned above, execute the method specified in the invocation of the genesis contract/system contract in a virtual machine such as EVM, and input corresponding parameters. In one example, the input parameters may include, for example, the identifier of the node to be deleted, the IP address of the node to be deleted, the port number of the node to be deleted, and the like. During the execution of the contract, the remaining consensus nodes may delete information of the node to be deleted from the local node list and sequentially number the remaining consensus nodes in the local node list. In this way, at least the consensus node lists maintained by the Quorum number of remaining consensus nodes have the same remaining consensus nodes that are numbered in the same order.

In some embodiments, as mentioned above, the consensus node can maintain a list of consensus nodes locally, that is, the aforementioned local list of nodes, which records the basic information of all the consensus nodes in the current blockchain network. In one example, the basic information may include, for instance, one or more of: a consensus node identifier, an IP address, a port number, and the like. Among them, the consensus nodes may be sequentially numbered in the local node list. A consensus node may have an identifier (ID), which may be an identifier that uniquely identifies the node, such as a public key, an IP address plus a port number, or the like of the node. The list of consensus nodes, in some blockchain projects, may logically exist in the world state. Take Ethereum, Fabric, and Consortium Blockchain as examples, each node maintains the world state locally, in which the latest states of all the accounts are available. For example, in Ethereum, a node can maintain the latest states of all the accounts based on the contents of the state tree, transaction tree, and receipt tree in the blocks.

In some embodiments, since the consensus nodes have performed several consensuses, theoretically, consistency of the consensus node lists has been maintained among the consensus nodes. For example, consensus nodes a, b, c, d, and m have the local node lists stored in their respective world states, and the consensus nodes stored in the local node lists of the respective nodes a, b, c, d, and m are five nodes a, b, c, d, and m, and are in the order of a-b-c-d-m. Then, the numbers of a, b, c, d, and m are 0, 1, 2, 3, and 4, respectively. In this way, for the deleted node m, each consensus node performs S801 on the basis of the locally maintained consensus node list, and the nodes in the local node list of the consensus node include nodes a, b, c, and d, a total of four nodes, and the same sequence numbers (e.g., 0-1-2-3) are configured for the remaining nodes.

In some embodiments, the consensus nodes may comprise two types: activated and inactivated. Activated consensus nodes may participate in consensus verification and may be stored in a local node list in sequential numbers. Inactivated consensus nodes may not participate in consensus verification, and therefore are not numbered together with the activated consensus nodes in the local node list. Thus, alternative to deleting the node to be deleted from the local node list described above, the node to be deleted may be set to an inactivated state. As a result, the node to be deleted may be frozen and thus no longer function as a consensus node without being removed from the blockchain network.

S803 includes performing, by the remaining consensus nodes, view change.

In S801, after the remaining consensus nodes execute the transaction for deleting the node, the remaining consensus nodes may update the local node lists. In the current view, the original nodes participating in consensus verification but have not executed the node deletion and their order remain. In this way, after the remaining consensus nodes perform the transaction of deleting the node, they may detect that the number of consensus nodes in the local consensus node list is inconsistent with the number of consensus nodes in the current view, or detect that the consensus node identifiers in the local consensus node list are inconsistent with the consensus node identifiers in the current view. Thus, the remaining consensus node may initiate view change.

In some embodiments, the R in the view change process (that is, the number of replicas in the view change process) is the total number of consensus nodes excluding the node to be deleted, that is, the number of nodes in the local node list excluding the node to be deleted.

In some embodiments, similar to the foregoing, a remaining consensus node may broadcast messages <view change, v+1, n, C, P, i> to other replica nodes, where n is the number of the latest stable checkpoint, C is the set of 2f+1 verified checkpoint messages, and P is the set of pre-prepare and prepare messages for which the replica node has not completed processing.

In some embodiments, there are five consensus nodes in total, numbered with a, b, c, d, and m, assuming that the remaining nodes include nodes a, b, c, and d, and the node to be deleted is node m. Node a is, for example, a primary node in the PBFT, and nodes b, c, d, and m are, for example, backup nodes in the PBFT. The number of the new primary node can be calculated by p=(v) mod |R|. For example, if p=1, then the new primary node is node b. Here, R is the number of nodes in the local node list excluding the node to be deleted. Each consensus node records the numbers of the five nodes a, b, c, d, and m in the local node list. In this case, R is equal to five. In an example with the execution of S801 to S803, each consensus node may sequentially number the remaining consensus nodes excluding the node to be deleted, that is, the remaining node a, b, c, and d may be sequentially numbered as 0, 1, 2, and 3. In this case, R becomes four. The view number in the process of view change increases, that is, from v to v+1 as described above.

In another example where there are five consensus nodes in total numbered as a, b, c, d, and m, assuming that the node to be deleted is node c, the remaining nodes include nodes a, b, d, and m. After executing the steps S801-S803, each consensus node may number the remaining consensus nodes (excluding the node to be deleted) based on the numbers of the consensus nodes before the node deletion. Thus, the remaining consensus nodes a, b, d, and m are re-numbered to 0, 1, 2, and 3.

In addition, for the method of configuring a consensus node in an inactivated state to freeze the consensus node, the remaining consensus nodes may initiate the view change in response to detecting any of the following conditions: the number of activated consensus nodes in the local consensus node list is inconsistent with the number of consensus nodes in the current view, or the identifiers of the activated consensus nodes in the local consensus node list are inconsistent with identifiers of the consensus nodes in the current view.

S805 includes after the view change is completed, participating, by the remaining consensus nodes, in consensus verification.

In some embodiments, after the view change is completed, each of the remaining consensus nodes excluding the deleted node locally has the same node number list and has the same block data, so that the remaining consensus nodes can participate in consensus verifications normally. In this way, the process of node deletion is completed.

FIG. 9 illustrate flowcharts of a method 900 for deleting a node in a blockchain network in accordance with various embodiments. The method 900 may be performed by a device, apparatus, or system for deleting a node in a blockchain network, such as a consensus node of the blockchain network (e.g., the blockchain node of FIGS. 1-3, the remaining consensus node of FIG. 7 or FIG. 10). The method 900 may be performed by a first consensus node of the blockchain network. The first consensus node may be a primary or backup node of a PBFT-based blockchain network. The first consensus node may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 900.

The operations of method 900 presented below are intended to be illustrative. Depending on the implementation, the method 900 may include additional, fewer, or alternative steps performed in various orders or in parallel. Further details of the method 900 can be referred to FIG. 1 to FIG. 8 and FIG. 10 and related descriptions. The steps for deleting a node in a blockchain network described with reference to FIG. 1 to FIG. 8 and FIG. 10 are included in the method 900.

Deleting the node in the blockchain network may include at least the following embodiments. In some embodiments, the node to be deleted (e.g., second consensus node) may be an activated consensus node of the blockchain network prior to the node deletion, and by the node deletion, the node becomes an inactivated consensus node of the blockchain network. An activated consensus node may participate in consensus verification. However, an inactivated consensus node may not participate in consensus verification and therefore may be a non-consensus node. In some embodiments, the node to be deleted may be a part of the blockchain network (e.g., as an activated consensus node) prior to the node deletion, and by the node deletion, the node is removed from the blockchain network.

Block S901 includes: obtaining, by a first consensus node of the blockchain network, a transaction comprising a request for deleting a second consensus node of the blockchain network. In some embodiments, the obtaining, by a first consensus node, a transaction comprises: obtaining the transaction from a client-side device or a command console of a controller. In some embodiments, the obtaining a transaction comprises: obtaining the transaction from the second consensus node, a third consensus node of the blockchain network, or an external device.

In some embodiments, the transaction is configured to invoke a blockchain contract deployed in a blockchain that is maintained by the blockchain network. In some embodiments, the blockchain contract comprises a genesis contract or a system contract.

Block S902 includes: in response to that consensus verification of the transaction succeeds, executing the transaction and sequentially numbering in a node list a plurality of remaining consensus nodes of the blockchain network excluding the second consensus node. In some embodiments, the executing the transaction comprises: deleting the second consensus node from the node list; or configuring the second consensus node to an inactivated state in the node list.

In some embodiments, the node list is in a world state of a blockchain maintained by the blockchain network. In some embodiments, the first consensus node locally maintains the node list, the node list comprising one or more of the following: consensus node identifier, consensus node IP address, and consensus node port number; and prior to the sequentially numbering in a node list a plurality of remaining consensus nodes of the blockchain network excluding the second consensus node, all consensus nodes of the blockchain network including the second consensus node were numbered sequentially in the node list.

Block S903 includes: performing view change for the remaining consensus nodes to participate in future consensus verification. In some embodiments, the performing view change comprises initiating the view change in response to receiving a message broadcast by the second consensus node for initiating view change.

In some embodiments, the performing view change comprises initiating the view change in response to detecting any of the following conditions: a number of consensus nodes in the node list is inconsistent with a number of consensus nodes in a current view; consensus node identifiers in the node list are inconsistent with consensus node identifiers in the current view; a number of activated consensus nodes in the node list is inconsistent with a number of consensus nodes in a current view; and identifiers of activated consensus nodes in the node list are inconsistent with identifiers of the consensus nodes in the current view.

In some embodiments, a number of replicas in the view change is a total number of the remaining consensus nodes excluding the second consensus node.

In some embodiments, the method further comprises: participating in consensus verification without the second consensus node.

Figure 10:
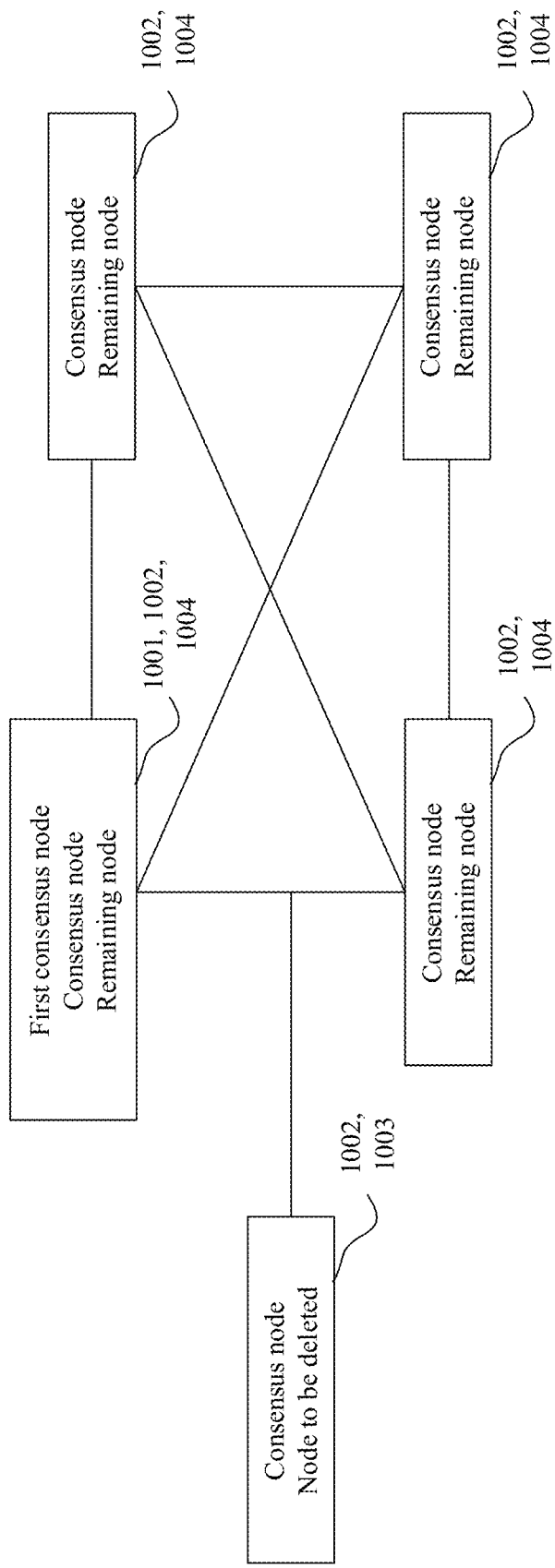
FIG. 10 illustrates a block diagram for implementing a blockchain network in accordance with various embodiments.

FIG. 10 illustrates a block diagram for implementing a blockchain network in accordance with various embodiments. As shown, before the node deletion, the blockchain network may comprise a plurality of consensus nodes 1002, of which the node to be deleted in the blockchain network is 1003 and the remaining nodes are 1004. Any of the consensus nodes 1004 may be a first consensus node for receiving a transaction. Here, node 1001 is designated as the first consensus node. In some embodiments, the blockchain network may be based on PBFT, and at each view, one of its nodes may be a primary nodes, with the remaining nodes being backup nodes.

In some embodiments, the first consensus node 1001 is configured for obtaining a transaction request for deleting the node 1003 and initiating consensus verification of the transaction request for deleting the node 1003 in the blockchain network. After the consensus verification succeeds, each of the consensus nodes 1002 is configured for executing the transaction for deleting the node 1003 and sequentially numbering the remaining consensus nodes 1004 excluding the node to be deleted 1003. The remaining consensus nodes 1004 are configured for performing view change, and after the view change is completed, participating in consensus verification with respect to the blockchain.

In some embodiments, the transaction request for deleting the node comprises a transaction request for invoking a contract. In some embodiments, the invoked contract comprises a genesis contract or a system contract. In some embodiments, the obtaining, by a first consensus node 1001, a transaction request for deleting a node comprises: obtaining, by the first consensus node 1001, the transaction request for deleting the node from a client-side device; or obtaining, by the first consensus node 1001, the transaction request for deleting the node from a command console of a controller.

In some embodiments, each of the consensus nodes 1002 is configured for locally maintaining a node list, the node list comprising one or more of the following of the consensus node 1002: identifier, IP address, and port number, wherein consensus nodes 1002 are numbered sequentially in the node list. In one embodiment, the node list locally maintained by the consensus node 1002 is in a world state.

In some embodiments, the executing, by the consensus node 1002, the transaction for deleting the node 1003 comprises: deleting, by the consensus node 1002, the consensus node 1003 from the node list; or configuring the consensus node 1003 to an inactivated state in the node list.

In some embodiments, any of the consensus nodes 1002 may be configured for initiating the view change in response to detecting any of the following conditions: a number of consensus nodes in the node list is inconsistent with a number of consensus nodes in a current view; consensus node identifiers in the node list are inconsistent with consensus node identifiers in the current view; a number of activated consensus nodes in the node list is inconsistent with a number of consensus nodes in a current view; and identifiers of activated consensus nodes in the node list are inconsistent with identifiers of the consensus nodes in the current view.

In some embodiments, the consensus node 1002 may initiating the view change in response to receiving a message broadcast by the consensus node 1003 for initiating view change.

In some embodiments, a number of replicas in the view change is a total number of the remaining consensus nodes 1004 excluding the consensus node 1003.

Figure 11:
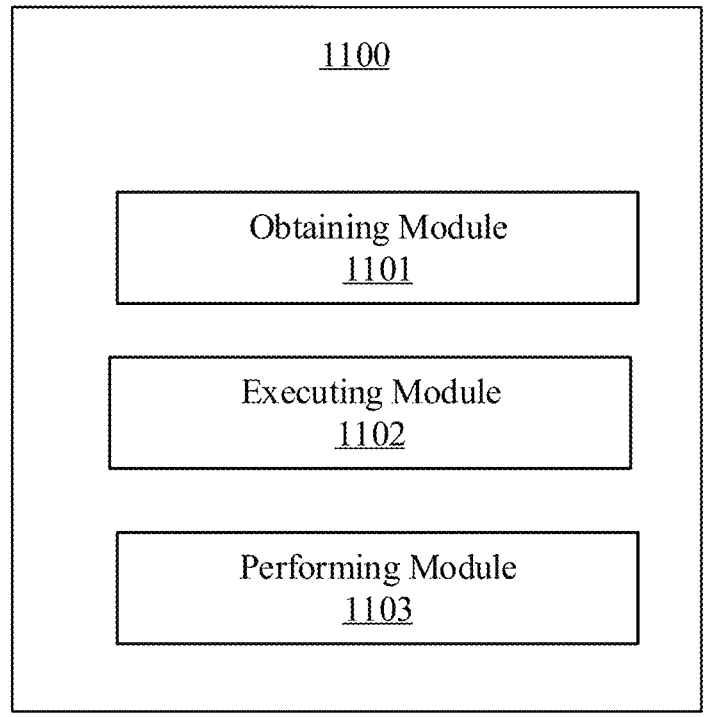
FIG. 11 illustrates a block diagram of an apparatus for deleting a node in a blockchain network in accordance with some embodiments.

FIG. 11 illustrates a block diagram of an apparatus 1100 for deleting a node in a blockchain network in accordance with some embodiments. The apparatus 1100 may be an example of an implementation of one or more components of a node (e.g., the blockchain node of FIGS. 1-3, the remaining consensus node of FIG. 7 or FIG. 10). The node may be a primary or backup node of a PBFT-based blockchain network. One or more steps of the method 800 and method 900 may be implemented by the apparatus 1100.

The apparatus 1100 may be implemented in a computer system or device comprising one or more processors and one or more non-transitory computer-readable storage media (e.g., one or more memories) coupled to the one or more processors and configured with instructions executable by the one or more processors to cause the system or device (e.g., the processor) to perform steps of the above-described method (e.g., the method 800 or 900). The apparatus 1100 may comprise various units/modules corresponding to the instructions (e.g., software instructions).

In some embodiments, the apparatus 1100 may comprise an obtaining module 1101 for obtaining a transaction comprising a request for deleting a second consensus node of the blockchain network; an executing module 1102 for, in response to that consensus verification of the transaction succeeds, executing the transaction and sequentially numbering in a node list a plurality of remaining consensus nodes of the blockchain network excluding the second consensus node; and a performing module 1103 for performing view change for the remaining consensus nodes to participate in future consensus verification.

The techniques described herein may be implemented by one or more special-purpose computing devices. The special-purpose computing devices may be desktop computer systems, server computer systems, portable computer systems, handheld devices, networking devices or any other device or combination of devices that incorporate hardwired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 12:
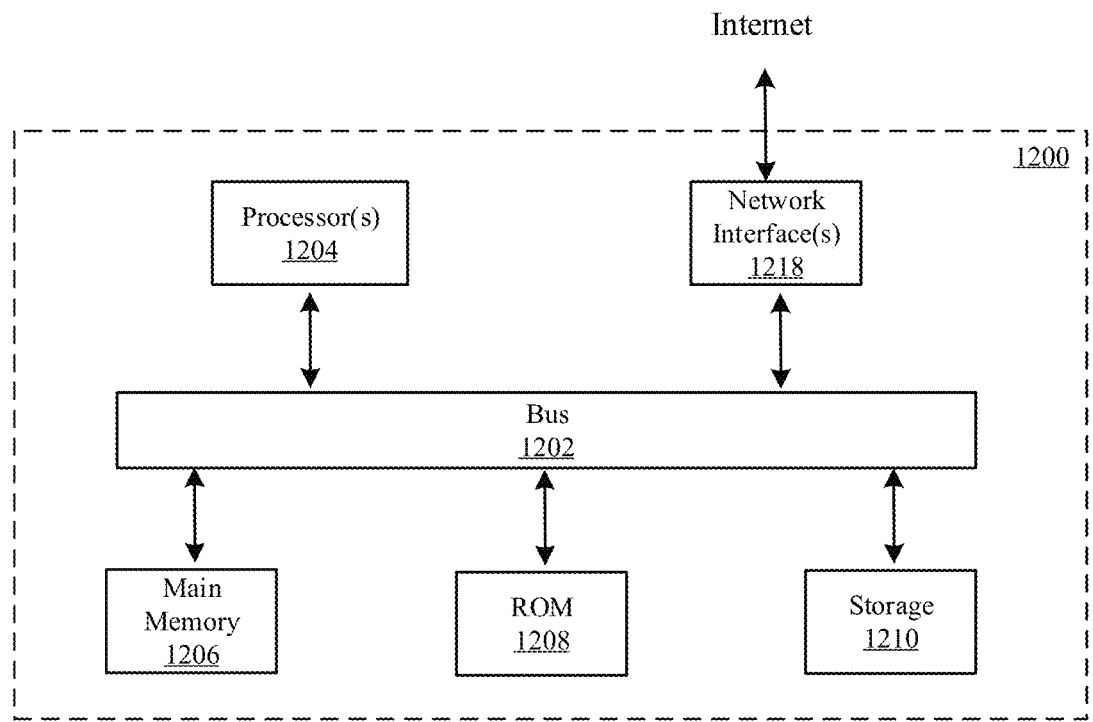
FIG. 12 illustrates a block diagram of an exemplary computer system in which any of the embodiments described herein may be implemented.

FIG. 12 illustrates a block diagram of a computer system in which any of the embodiments described herein may be implemented. The system 1200 may be implemented in any of the components of the environments, systems, or devices illustrated in FIGS. 1-7, FIG. 10, and FIG. 11. One or more of the methods illustrated by FIGS. 8 and 9 may be performed by one or more implementations of the computer system 1200.

The computer system 1200 may include a bus 1202 or other communication mechanism for communicating information, one or more hardware processor(s) 1204 coupled with bus 1202 for processing information. Hardware processor(s) 1204 may be, for example, one or more general purpose microprocessors.

The computer system 1200 may also include a main memory 1206, such as a random access memory (RAM), cache and/or other dynamic storage devices, coupled to bus 1202 for storing information and instructions executable by processor(s) 1204. Main memory 1206 also may be used for storing temporary variables or other intermediate information during execution of instructions executable by processor(s) 1204. Such instructions, when stored in storage media accessible to processor(s) 1204, render computer system 1200 into a special-purpose machine that is customized to perform the operations specified in the instructions. The computer system 1200 may further include a read only memory (ROM) 1208 or other static storage device coupled to bus 1202 for storing static information and instructions for processor(s) 1204. A storage device 1210, such as a magnetic disk, optical disk, or USB thumb drive (Flash drive), etc., may be provided and coupled to bus 1202 for storing information and instructions.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the operations, methods, and processes described herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 may cause processor(s) 1204 to perform the process steps described herein. In alternative embodiments, hard-wired circuitry may be used in place of or in combination with software instructions.

The main memory 1206, the ROM 1208, and/or the storage device 1210 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 1200 may include a network interface 1218 coupled to bus 1202. Network interface 1218 may provide a two-way data communication coupling to one or more network links that are connected to one or more local networks. For example, network interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or WAN component to communicate with a WAN). Wireless links may also be implemented. In any such implementation, network interface 1218 may send and receive electrical, electromagnetic or optical signals that carry digital data streams representing various types of information.

The computer system 1200 can send messages and receive data, including program code, through the network (s), network link and network interface 1218. In the Internet example, a server might transmit a requested code for an application program through the Internet, the ISP, the local network and the network interface 1218.

The received code may be executed by processor(s) 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be deleted to or removed from the disclosed embodiments. The examples of systems and components described herein may be configured differently than described. For example, elements may be deleted to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, deletions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:

1. A computer-implemented method for deleting a primary node or a backup node in a blockchain network, performed by a first consensus node of the blockchain network, wherein the blockchain network is based on Practical Byzantine Fault Tolerance (PBFT) as a consensus algorithm for reaching a network-wide consensus for block information through consensus verifications, the method comprising:

obtaining a transaction comprising a request for deleting a second consensus node of the blockchain network, wherein all consensus nodes of the blockchain network including the first consensus node and the second consensus node are each numbered sequentially in a node list, one of the consensus nodes is designated as a primary node for initiating the consensus verifications, and the first consensus node locally maintains a copy of the node list;

in response to that consensus verification of the transaction succeeds, executing the transaction and sequentially re-numbering in the node list a plurality of remaining consensus nodes of the blockchain network excluding the second consensus node;

initiating a view change protocol of PBFT in response to detecting any of a plurality of conditions comprising:
a number of consensus nodes in the node list is inconsistent with a number of consensus nodes in a current view,
consensus node identifiers in the node list are inconsistent with consensus node identifiers in the current view,
a number of activated consensus nodes in the node list is inconsistent with a number of consensus nodes in a current view, and
identifiers of activated consensus nodes in the node list are inconsistent with identifiers of the consensus nodes in the current view; and performing the view change protocol of PBFT based at least on the re-numbered plurality of remaining consensus nodes in the node list to change the designation of the primary node, wherein the change of the designation of the primary node enables the remaining consensus nodes to participate in future consensus verifications without the second consensus node.

2. The computer-implemented method of claim 1, wherein the transaction is configured to invoke a blockchain contract deployed in a blockchain that is maintained by the blockchain network.

3. The computer-implemented method of claim 2, wherein the blockchain contract comprises a genesis contract or a system contract.

4. The computer-implemented method of claim 1, wherein the obtaining, by a first consensus node, a transaction comprises:
obtaining the transaction from a client-side device or a command console of a controller.

5. The computer-implemented method of claim 1, wherein:
the node list comprises one or more of the following: consensus node identifier, consensus node IP address, and consensus node port number.

6. The computer-implemented method of claim 1, wherein the node list is in a world state of a blockchain maintained by the blockchain network.

7. The computer-implemented method of claim 1, wherein the executing the transaction comprises:
deleting the second consensus node from the node list; or
configuring the second consensus node to an inactivated state in the node list.

8. The computer-implemented method of claim 1, wherein the performing a view change protocol of PBFT comprises initiating the view change protocol of PBFT in response to receiving a message broadcast by the second consensus node for initiating the view change protocol of PBFT.

9. The computer-implemented method of claim 1, wherein a number of replicas in the view change protocol of PBFT is a total number of the remaining consensus nodes excluding the second consensus node.

10. The computer-implemented method of claim 1, wherein the obtaining a transaction comprises:
obtaining the transaction from the second consensus node, a third consensus node of the blockchain network, or an external device.

11. The computer-implemented method of claim 1, further comprising:
participating in consensus verification without the second consensus node.

12. A non-transitory computer-readable storage medium for deleting a primary node or a backup node in a blockchain network, wherein the blockchain network is based on Practical Byzantine Fault Tolerance (PBFT) as a consensus algorithm for reaching a network-wide consensus for block information through consensus verifications, the non-transitory computer-readable storage medium implemented in a first consensus node of the blockchain network, the non-transitory computer-readable storage medium configured with instructions executable by one or more processors to cause the one or more processors to perform operations comprising:
obtaining a transaction comprising a request for deleting a second consensus node of the blockchain network, wherein all consensus nodes of the blockchain network including the first consensus node and the second consensus node are each numbered sequentially in a node list, one of the consensus nodes is designated as a primary node for initiating the consensus verifications, and the first consensus node locally maintains a copy of the node list;
in response to that consensus verification of the transaction succeeds, executing the transaction and sequentially re-numbering in the node list a plurality of remaining consensus nodes of the blockchain network excluding the second consensus node;
initiating a view change protocol of PBFT in response to detecting any of a plurality of conditions comprising:
a number of consensus nodes in the node list is inconsistent with a number of consensus nodes in a current view,
consensus node identifiers in the node list are inconsistent with consensus node identifiers in the current view,
a number of activated consensus nodes in the node list is inconsistent with a number of consensus nodes in a current view, and
identifiers of activated consensus nodes in the node list are inconsistent with identifiers of the consensus nodes in the current view; and
performing the view change protocol of PBFT based at least on the re-numbered plurality of remaining consensus nodes in the node list to change the designation of the primary node, wherein the change of the designation of the primary node enables the remaining consensus nodes to participate in future consensus verifications without the second consensus node.

13. The non-transitory computer-readable storage medium of claim 12, wherein:
the node list comprising one or more of the following: consensus node identifier, consensus node IP address, and consensus node port number.

14. The non-transitory computer-readable storage medium of claim 12, wherein the executing the transaction comprises:
deleting the second consensus node from the node list; or
configuring the second consensus node to an inactivated state in the node list.

15. The non-transitory computer-readable storage medium of claim 12, wherein the operations further comprise:
participating in consensus verification without the second consensus node.

16. A system for deleting a primary node or a backup node in a blockchain network, the system implemented in a first consensus node of the blockchain network, wherein the blockchain network is based on Practical Byzantine Fault Tolerance (PBFT) as a consensus algorithm for reaching a network-wide consensus for block information through consensus verifications, the system comprising one or more processors and one or more computer-readable memories coupled to the one or more processors and having instructions stored thereon that are executable by the one or more processors to perform operations comprising:
obtaining a transaction comprising a request for deleting a second consensus node of the blockchain network, wherein all consensus nodes of the blockchain network including the first consensus node and the second consensus node are each numbered sequentially in a node list, one of the consensus nodes is designated as a primary node for initiating the consensus verifications, and the first consensus node locally maintains a copy of the node list;
in response to that consensus verification of the transaction succeeds, executing the transaction and sequentially re-numbering in the node list a plurality of remaining consensus nodes of the blockchain network excluding the second consensus node;
initiating a view change protocol of PBFT in response to detecting any of a plurality of conditions comprising:
a number of consensus nodes in the node list is inconsistent with a number of consensus nodes in a current view,
consensus node identifiers in the node list are inconsistent with consensus node identifiers in the current view,
a number of activated consensus nodes in the node list is inconsistent with a number of consensus nodes in a current view, and
identifiers of activated consensus nodes in the node list are inconsistent with identifiers of the consensus nodes in the current view; and
performing the view change protocol of PBFT based at least on the re-numbered plurality of remaining consensus nodes in the node list to change the designation of the primary node, wherein the change of the designation of the primary node enables the remaining consensus nodes to participate in future consensus verifications without the second consensus node.

17. The system of claim 16, wherein:
the node list comprising one or more of the following: consensus node identifier, consensus node IP address, and consensus node port number.

18. The system of claim 16, wherein the executing the transaction comprises:
deleting the second consensus node from the node list; or
configuring the second consensus node to an inactivated state in the node list.

19. The system of claim 16, wherein the operations further comprise:
participating in consensus verification without the second consensus node.

* * * * *